(12) United States Patent
Bakshi et al.

(10) Patent No.: US 11,550,703 B2
(45) Date of Patent: Jan. 10, 2023

(54) TEST PACKAGE ANALYZER

(71) Applicant: Webomates Inc., Stamford, CT (US)

(72) Inventors: Aseem Bakshi, Darien, CT (US); Ruchika Gupta, Norwalk, CT (US)

(73) Assignee: WEBOMATES INC., Stamford, CT (US)

( * ) Notice: Subject to any disclaimer, the term of this patent is extended or adjusted under 35 U.S.C. 154(b) by 0 days.

(21) Appl. No.: 17/136,685

(22) Filed: Dec. 29, 2020

(65) Prior Publication Data
US 2022/0206927 A1 Jun. 30, 2022

(51) Int. Cl.
*G06F 11/36* (2006.01)
*G06N 20/00* (2019.01)
*G06Q 30/06* (2012.01)

(52) U.S. Cl.
CPC ........ *G06F 11/368* (2013.01); *G06F 11/3688* (2013.01); *G06N 20/00* (2019.01); *G06Q 30/0631* (2013.01)

(58) Field of Classification Search
CPC ... G06F 11/368; G06F 11/3688; G06N 20/00; G06Q 30/0631
See application file for complete search history.

(56) References Cited

U.S. PATENT DOCUMENTS

| | | | | |
|---|---|---|---|---|
| 7,873,944 | B2* | 1/2011 | Bangel | G06F 11/3664 717/124 |
| 8,561,036 | B1* | 10/2013 | Beans | G06F 11/368 717/140 |
| 9,268,672 | B1* | 2/2016 | Gupta | G06F 11/3688 |
| 9,317,412 | B1* | 4/2016 | Cohen | G06F 11/368 |
| 9,417,867 | B2* | 8/2016 | Abuelsaad | G06F 8/71 |
| 10,831,640 | B2* | 11/2020 | Bakshi | G06F 11/3696 |
| 10,963,372 | B1* | 3/2021 | Jena | G06F 8/38 |
| 11,115,137 | B2* | 9/2021 | Subramanian | H04B 17/29 |
| 2014/0282411 | A1* | 9/2014 | Liemandt | G06F 11/3672 717/124 |
| 2015/0220426 | A1* | 8/2015 | Spektor | G06F 8/71 717/131 |
| 2016/0306627 | A1* | 10/2016 | Hewitt | G06F 8/73 |
| 2017/0262360 | A1* | 9/2017 | Kochura | G06F 11/3688 |
| 2018/0165122 | A1* | 6/2018 | Dobrev | G06F 9/45558 |
| 2018/0189168 | A1* | 7/2018 | Dwarakanath | G06F 11/3684 |
| 2018/0293507 | A1* | 10/2018 | Lian | G06N 20/00 |

(Continued)

*Primary Examiner* — Douglas M Slachta
(74) *Attorney, Agent, or Firm* — Shumaker, Loop & Kendrick, LLP

(57) ABSTRACT

A system and a method for recommending a modification to a test package for a software under test. A release note package associated to a feature of a software is received. The release note package is analysed in real time using machine learning based models. Further, a keyword is extracted from the release note package using a keyword extraction technique. The keyword corresponds to the feature of the software. The keyword is compared with nomenclatures present in a test package using a pattern matching technique. The test package is associated to the feature of the software. Finally, a modification to the test package is recommended based on the comparison. The modification comprises addition, deletion, or updating an existing element of the test package. It may he noted that the modification is recommended using an Artificial Intelligence (AI) technique.

15 Claims, 3 Drawing Sheets

(56) References Cited

U.S. PATENT DOCUMENTS

| | | | |
|---|---|---|---|
| 2018/0307590 A1* | 10/2018 | Padhi | G06F 11/3668 |
| 2019/0079741 A1* | 3/2019 | Makkar | G06F 8/75 |
| 2019/0087179 A1* | 3/2019 | Velayudham | G06F 11/008 |
| 2019/0095318 A1* | 3/2019 | Bahrami | G06F 11/3676 |
| 2019/0155722 A1* | 5/2019 | Gupta | G06F 11/302 |
| 2019/0286734 A1* | 9/2019 | Kao | G06N 20/00 |
| 2021/0192366 A1* | 6/2021 | Kadambi | G06F 16/3344 |

* cited by examiner

300

TEST PACKAGE ANALYZER

PRIORITY INFORMATION

The present application does not claim a priority from any other application.

TECHNICAL FIELD

The present subject matter described herein, in general, relates to a system and a method for recommending a modification to a test package for a software under test.

BACKGROUND

Generally, a software is launched after performing a series of testing on each functionality of the software. To perform the testing, a tester may create a set of test cases to validate each functionality of the software. Further, the testing may be carried out using a manual testing framework or an automated testing framework. A developer creates a release note package associated with the modification or the feature addition in the software when the developer makes any modification or a feature addition in the software. It is to be noted that due to a change in the software the test case associated with the software is impacted. Therefore, there is a need to identify the impacted test cases. Currently, identification of the impacted test cases solely relies on manual skills which takes a lot of time and is error prone.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for recommending a modification to a test package for a software under test. This summary is not intended to identify essential features of the claimed subject matter nor is it intended for use in determining or limiting the scope of the claimed subject matter.

In one implementation, a method for recommending a modification to a test package for a software under test is disclosed. Initially, a release note package associated to a feature of a software may be received. Further, the release note package may be analysed in real time using machine learning based models. Subsequent to analysing, a keyword from the release note package may be extracted using a keyword extraction technique. It may be noted that the keyword corresponds to the feature of the software. Further, the keyword may be compared with nomenclatures present in a test package using a pattern matching technique. The test package may be associated to the feature of the software. Finally, a modification may be recommended to the test package based on the comparison. It may be noted that the modification is recommended using an Artificial Intelligence (AI) technique. In one aspect, the aforementioned method for recommending a modification to a test package for a software under test may be performed by a processor using programmed instructions stored in a memory.

In another implementation, a non-transitory computer readable medium embodying a program executable in a computing device for recommending a modification to a test package for a software under test is disclosed. The program may comprise a program code for receiving a release note package associated to a feature of a software. Further, the program may comprise a program code for analysing the release note package in real time using machine learning based models. Subsequently, the program may comprise a program code for extracting a keyword from the release note package using a keyword extraction technique. It may be noted that the keyword corresponds to the feature of the software. Further, the program may comprise a program code for comparing the keyword with nomenclatures present in a test package using a pattern matching technique. The test package may be associated to the feature of the software. Finally, the program may comprise a program code for recommending a modification to the test package based on the comparison. It may be noted that the modification is recommended using an Artificial Intelligence (AI) technique.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for recommending a modification to a test package for a software under test disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
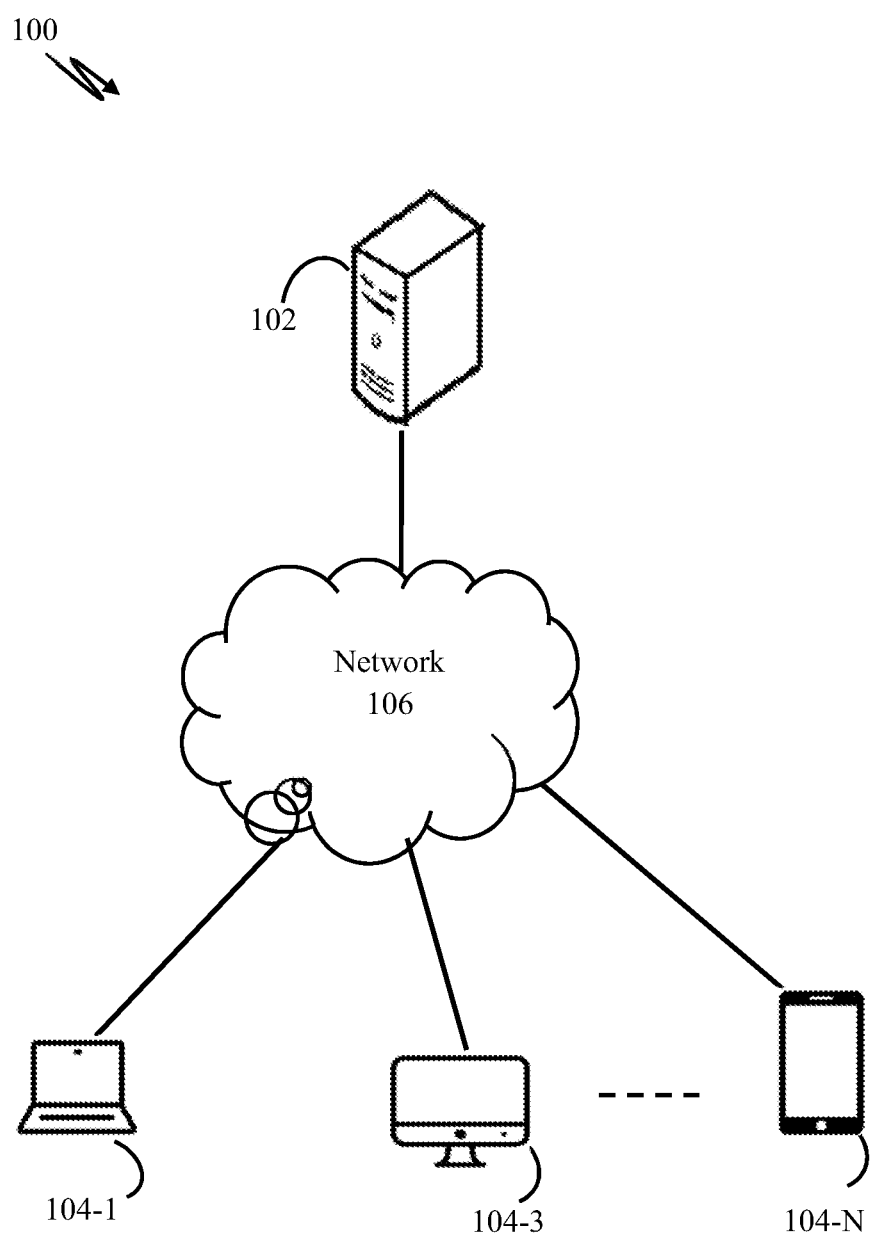
FIG. 1 illustrates a network implementation for recommending a modification to a test package for a software under test, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "analysing," "extracting," "comparing," "recommending," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a system and a method for recommending a modification to a test package for a software under test. It may be noted that the test package may comprise at least a test strategy, a test case, a test model, an automation test script, a crowdsource script, and a manual test script. In order to recommend the modification to the test package, the system may receive a release note package associated with a feature of the software. The release note package comprises an epic, a story board, a user story, an objective, a task, a feature name, a feature description, an attachment associated to the feature, a comment, releases notes, defect fix notes, configuration change, and code change. The release note package is provided by a developer when the developer makes any modification in the software. The modification may comprise an addition, a deletion, or updating an existing element of the test package. It may be noted that whenever there is a modification in the software, software testing or regression testing is required. After receiving the release note package, the system analyses the release note package and extracts relevant keywords from the release note package. It may be noted that the system also deletes common words that are not relevant. Further, the system compares the extracted keywords with the nomenclatures present in the test package. Furthermore, the system recommends a modification to the test package based on the comparison. In other words, the system automatically determines impacted test cases due to a change in the software.

Referring now to FIG. 1, a network implementation 100 of a system 102 for recommending a modification to a test package for a software under test is disclosed. Initially, the system 102 receives a release note package associated to a feature of a software. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives a release note package associated to a feature of a software from one or more user devices 104. Further, the system may also 102 receive a feedback from a user using the user devices 104. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for recommending a modification to a test package for a software under test. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for recommending a modification to a test package for a software under test. The system may receive a release note package associated to a feature of a software. The release note package may comprise an epic, a story board, a user story, an objective, a task, a feature name, a feature description, an attachment associated to the feature, a comment, releases notes, defect fix notes, configuration change, and code change. It may be noted that the feature may be present on a User Interface (UI) or an Application Programming Interface (API) of the software. In an embodiment, a user or a developer submits the release note package to the system.

Further to receiving the release note package, the system 102 may analyse the release note package in real time using machine learning based models. In an embodiment, the system 102 receives a release note package comprising an attachment and a comment. The system 102 further analyses the attachment and the comment in real time using machine learning based models. In an embodiment, the system analyses information present inside the attachment. Example of the attachment may include an image, a video or a media file depicting a change in the feature of the software. The comment may include a description of the change in the feature of the software. It must be noted that the system may clean the release note packages by eliminating at least a garbage word, a common word, a junk word, and a syntax, a library definition and alike.

Subsequent to analysing the release note package, the system may extract a keyword from the release note package using a keyword extraction technique. It may be noted that the keyword may correspond to the feature of the software. The keywords may be extracted using at least one of a Rapid Automatic Keyword Extraction (RAKE) algorithm, a Bidirectional Encoder Representations from Transformers (BERT), a FastText, a Support Vector Machines (SVM), a Conditional Random Fields (CRF), AWS comprehend, Google Cloud Natural API, and a Term Frequency-Inverse Document Frequency (TF-IDF) algorithm. In one embodiment, the keywords are extracted by removing common words present in the release note package. In one embodiment, the keywords may be extracted using a combination of two or more aforementioned algorithms.

Consider an example, the system receives a release note package comprising a feature name, a feature description, and a comment. The feature name may be Account Page, the feature description may be "Sign in Button is modified into Log in Button", the comment may be "Update the test case". Further, the system 102 analyses the release note package. Furthermore, the system extracts keyword from the release note package. In the example, the extracted keywords may be "Account Page", "Sign In", "Modified", and "Log In". It may be noted that the keywords are extracted using at least one of a Rapid Automatic Keyword Extraction (RAKE) algorithm, a Bidirectional Encoder Representations from Transformers (BERT), a FastText, a Support Vector Machines (SVM), a Conditional Random Fields (CRF), AWS comprehend, Google Cloud Natural API, and a Term Frequency-Inverse Document Frequency (TF-IDF) algorithm.

Further to extracting, the system 102 may compare the keyword with nomenclatures present in a test package using a pattern matching technique. In one embodiment, the keyword may be compared with nomenclatures using a pattern matching technique and the AI technique. Example of the AI technique may include but not limited to an Amazon Comprehend (AWS Comprehend), Google Cloud Natural API, an Information Retrieval model, a Semantic Textual Similarity model, and a Paraphrase Identification. The test package may be associated to the feature of the software. It may be noted that the test package is pre-stored in the system 102. The test package may consist of at least a test strategy, a test case, a test model, an automation test script, a crowdsource script and a manual test script. In one example, the nomenclatures present in a test package may also be referred to keywords present in the test package.

The test strategy refers to the number of test cases and the types of test cases which may be composed of happy days scenarios, negative tests and all permutations and combinations of test cases for a software under test. The test cases may give an idea about the steps to be executed and validations points to be satisfy in order to pass the test case. The test script may be used to execute the test case either in an automation testing, a crowdsourcing testing, an Artificial Intelligent manual testing system.

After comparing the keyword, the system 102 may automatically recommend a modification to the test package based on the comparison. It may be noted that the modification is recommended using Artificial Intelligence (AI) technique. The AI techniques may comprise an Amazon Comprehend (AWS Comprehend), Google Cloud Natural API, an Information Retrieval model, a Semantic Textual Similarity model, and a Paraphrase Identification. The Information Retrieval model performs a search query. It may be noted that the search query may be performed on keywords, questions, sentences, and paragraphs. In one embodiment, a combination of above two models may be used for automatically recommending the modification to the test package. In another embodiment, the modification may be recommended using Machine Learning (ML) models. The Machine Learning models may comprise but not limited to Support Vector Machine (SVM), Random Forest algorithm and a like. Further, the modification comprises addition, deletion, or updating an existing element of the test package. In an example, the modification to the test package may also be referred as impacted test package.

In an example, the system 102 receives a release note package comprising a comment—"Update button is modified into Edit button". Further, the system analyses the release note package using Machine Learning Models. The system extracts the keyword "Update", "Modified", and "Edit" from the release note package. Subsequently, the system compares the keyword with nomenclatures present in a test package using a pattern matching technique. The nomenclatures present in the test package may include a test case for testing the feature of the software. It may be noted that the test case is pre-stored in the system 102. The test case for checking functionality of an Update button may be referred as "Click on the Update button". Furthermore, the system 102 automatically recommends a modification to the test package (the test case) based on the comparison. The modification may be recommended as—"The Update button is modified into Edit button. The modified test case should be—Click on edit button". It may be noted that the recommended modification is for updating an existing element of the test package.

TABLE 1

| Test Case (Pre-stored) | Release note package | System Recommendation |
| --- | --- | --- |
| Click on Update Button | Update button is modified into Edit button | The Update button is modified into Edit button. The modified test case should be - Click on edit button |

In an embodiment, the system 102 also provides an additional option to a user to determine the modification to the test package. It may be noted that the user can add, delete, or update the test package. In one implementation, the system may provide the user an option to mix an AI algorithm with a human verification system to improve the accuracy of the system 102.

Consider an example of an E-commerce platform. The system 102 receives a release note package regarding a modification by a developer. Further, the system may analyse the release note package. Furthermore, the system may extract a keyword from the release note package. Subsequently, the system may compare the keyword with nomenclatures present in a test package. The test package may comprise test cases that cover the common functionality provided by the E-commerce platform. Further, some test cases may comprise customizations that are made for specific implementations of the E-commerce platform for individual customers. In the example, the system 102 may recommend a modification to the test package (test cases) based on the comparison of nomenclature present in the test cases and the keywords extracted from the release note package. In the example, when the developer adds any new feature in the E-commerce platform, the system 102 will check in the test package whether the relevant test case for the new feature is present or not. If the test case is missing, the system 102 will recommend update/modification in the test case.

Consider another example where a software is installed in a machine. It may be noted that the machine may comprise a processor, and a memory. Further, a set of instructions are stored in the memory of the machine. It may be noted that the system controls internal and external interactions of the machine and the software. In case of customisations to the machine, the system may determine impacted test cases to be resolved in real time. Thus, it may be noted that the system is not limited to the software test cases but also extends to the machine and software interactions.

In an embodiment, the system, 102 receives a first release note package at a particular time instance. Further, the system 102 analyses the first release note and extracts the keyword corresponding to the feature of the software. After comparing the keyword with nomenclatures present in a test package, the system 102 recommends a modification to the test package. Further, the system 102 receives a second release note package in future. It may be noted that at this time instance the modification recommended by the system earlier has already been acknowledged. Further, the system 102 analyses the second release note package and extracts the keyword corresponding to the feature of the software. After comparing the keyword with nomenclatures present in a test package, the system 102 recommends another modification to the test package. It may be noted that the same steps may be followed when the system receives the release note package for the subsequent regressions thereby training the system 102.

Figure 2:
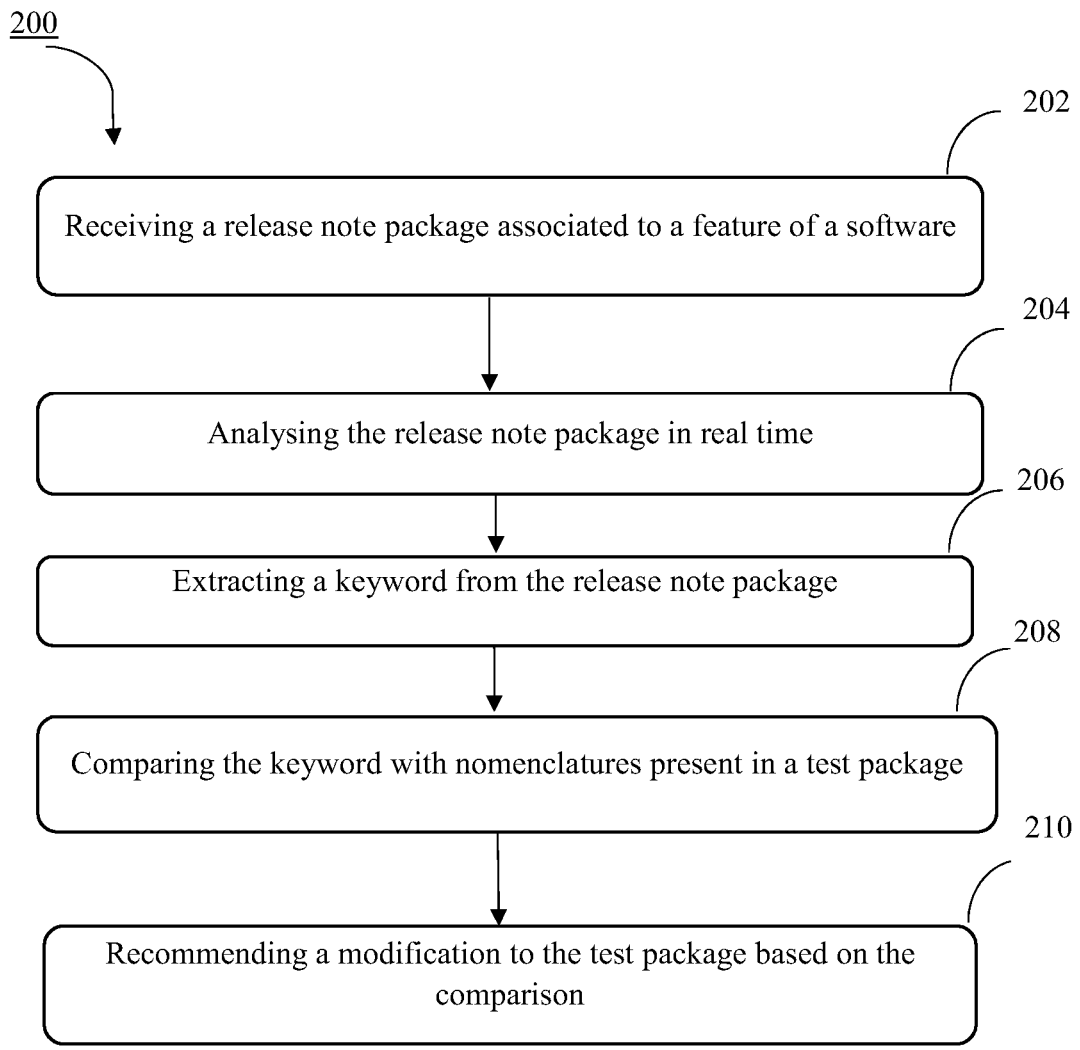
FIG. 2 illustrates a method for recommending a modification to a test package for a software under test, in accordance with an embodiment of the present subject matter.

Referring now to FIG. 2, a method 200 for recommending a modification to a test package for a software under test is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for recommending a modification to a test package for a software under test. Additionally, individual blocks may be deleted from the method 200 without departing from the scope of the subject matter described herein. Furthermore, the method 200 for recommending a modification to a test package for a software under test can be implemented in any suitable hardware, software, firmware, or combination thereof. However, for ease of explanation, in the embodiments described below the method 200 may be considered to be implemented in the above-described system 102.

At block 202, a release note package associated to a feature of a software may be received. The release note package may comprise a feature name, a feature description, an attachment associated to the feature, user story, a comment, releases notes, defect fix notes, configuration change, and code change At block 204, the release note package may be analysed in real time using machine learning based models.

At block 206, a keyword may be extracted from the release note package using a keyword extraction technique. It may be noted that the keyword corresponds to the feature of the software. It may be noted that the keywords are extracted using at least one of a Rapid Automatic Keyword Extraction (RAKE) algorithm, a Bidirectional Encoder Representations from Transformers (BERT), a FastText, a Support Vector Machines (SVM), a Conditional Random Fields (CRF), and a Term Frequency-Inverse Document Frequency (TF-IDF) algorithm.

At block 208, the keyword may be compared with nomenclatures present in a test package using a pattern matching technique. It may be noted that the test package may be associated to the feature of the software. The test package may comprise at least a test strategy, a test case, a test model, an automation test script, a crowdsource script and a manual test script At block 210, a modification to the test package may be recommended based on the comparison. Further, the modification is recommended using Artificial Intelligence (AI) technique.

Figure 3:
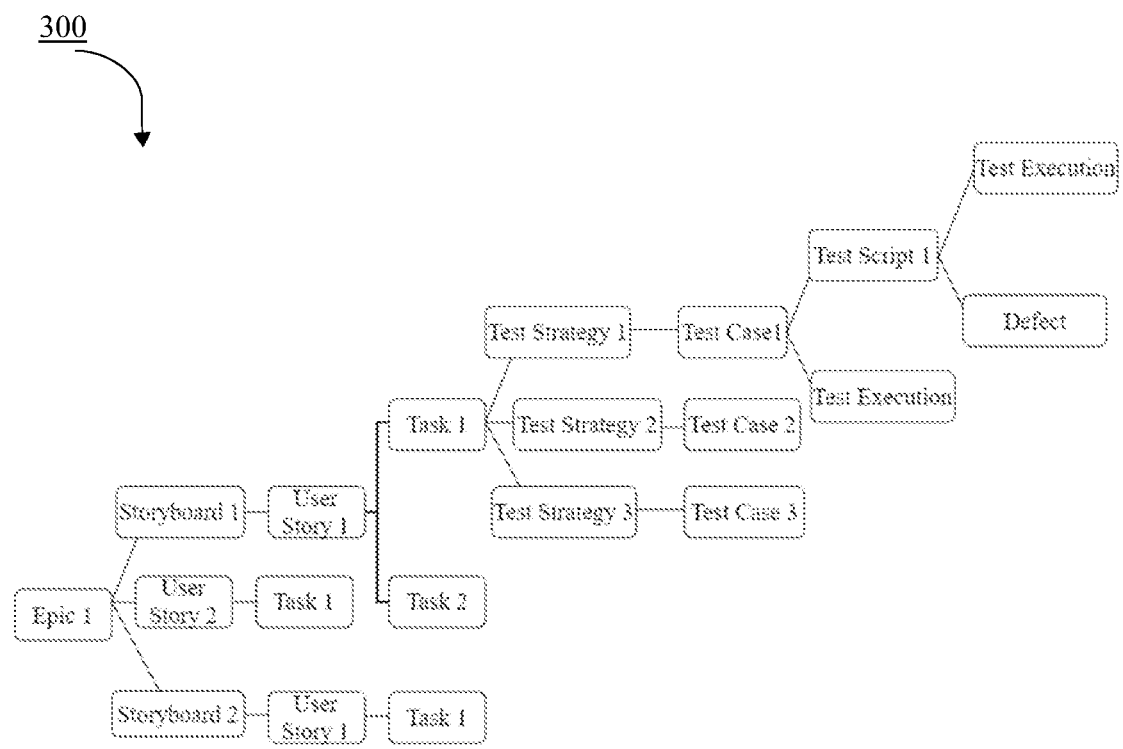
FIG. 3 illustrates a relationship between the release note package and the test package, in accordance with an embodiment of the present subject matter.

Referring now to FIG. 3, a relationship 300 between the release note package and the test package is shown, in accordance with an embodiment of the present subject matter is disclosed. In an example, the relationship 300 may also be called as traceability of the release note package and the test case package. The release note package comprises an epic, a story board, a user story, an objective, a task, a feature name, a feature description, an attachment associated to the feature, a comment, releases notes, defect fix notes, configuration change, and code change. It may be noted that a developer defines the epic. The epic may be further divided to a plurality of storyboard and a plurality of user story. Furthermore, the User Story comprises a plurality of Tasks. Subsequently, the task may comprise a plurality of Test Strategies. Further, the Test Strategy comprises a plurality of Test Cases. Subsequently, the Test Case may comprise a plurality of Test Scripts. In an embodiment after executing the Test Scripts a plurality of defects may be identified. Further, the epic, the storyboard, the user story, and the task are part of a development stage. Furthermore, the test strategy, the test cases, the test scripts, and the test execution are part of a testing stage. It may be noted that the system 102 analyses the release note package in real time.

Consider an example, a developer makes a change in a software. Further, the developer may provide a release note package associated to the change software. In order to recommend a modification to the test package, the system 102 traces the release note package in real time.

Exemplary embodiments discussed above may provide certain advantages. Though not required to practice aspects of the disclosure, these advantages may include those provided by the following features.

Some embodiments of the system and the method enables recommending a modification to the test package in real time without any human intervention Some embodiments of the system and the method reduces time required for regression testing.

Some embodiments of the system and the method enables recommending a modification to the test package in a machine and a software.

Some embodiments of the system and the method helps to determine an impact when modification to a test package is implemented.

Some embodiments of the system and the method reduces time of a software tester in detecting modification to a test package for a software.

Some embodiments of the system and the method enables possibility of using a human to identify test package that are impacted based on reading the release note package.

Although implementations for methods and system for recommending a modification to a test package for a software under test have been described in language specific to structural features and/or methods, it is to be understood that the appended claims are not necessarily limited to the specific features or methods described. Rather, the specific features and methods are disclosed as examples of implementations for recommending a modification to a test package for a software under test.

The invention claimed is:

1. A method for recommending a modification to a test package for a software under test, the method comprises:
   receiving, by a processor, a release note package associated to a feature of a software, wherein the release note package comprises at least an epic, a story board, a user story, an objective, a task, a feature name, a feature description, an attachment associated to the feature, a comment, releases notes, defect fix notes, configuration change, and code change;
   during execution, analyzing, by the processor, the release note package in real time using machine learning based models;
   extracting, by the processor, a keyword from the release note package using a keyword extraction technique, wherein the keyword corresponds to the feature of the software;
   comparing, by the processor, the keyword with nomenclatures present in a test package using a pattern matching technique, wherein the test package is associated to the feature of the software, and wherein the test package comprises at least a test strategy, a test case, a test model, an automation test script, a crowdsource script and a manual test script; and
   recommending, by the processor, a modification to the test package based on the comparison, wherein the modification is recommended using an Artificial Intelligence (AI) technique.

2. The method as claimed in claim 1, wherein the modification comprises addition, deletion, or updating an existing element of the test package.

3. The method as claimed in claim 1, wherein the keywords are extracted using at least one of a Rapid Automatic Keyword Extraction (RAKE) algorithm, a Bidirectional Encoder Representations from Transformers (BERT), a FastText, a Support Vector Machines (SVM), a Conditional Random Fields (CRF), AWS comprehend, Google Cloud Natural API, and a Term Frequency inverse Document Frequency (TF-IDF) algorithm.

4. The method as claimed in claim 1, wherein the keywords are extracted by removing common words present in the release note package.

5. The method as claimed in claim 1, wherein the feature is present on a User Interface (UI) or API of the software.

6. The method as claimed in claim 1, further comprises recommending modification for an E-commerce platform based on customizations covering common functionality for individual customers, wherein the modification is recommended for specific implementations of the E-commerce platform.

7. The method as claimed in claim 1, wherein the recommendation is applied to scenarios for test cases that encompass machine and software interactions, and wherein the test cases include machine only test cases and machine and software interaction test cases.

8. A system for recommending a modification to a test package for a software under test, the system comprises:
   a memory; and
   a processor coupled to the memory, wherein the processor is configured to execute program instructions stored in the memory for:
   receiving a release note package associated to a feature of a software, wherein the release note package comprises at least an epic, a story board, a user story, an objective, a task, a feature name, a feature description, an attachment associated to the feature, a comment, releases notes, defect fix notes, configuration change, and code change;
   during execution, analyzing the release note package in real time using machine learning based models;
   extracting a keyword from the release note package using a keyword extraction technique, wherein the keyword corresponds to the feature of the software;
   comparing the keyword with nomenclatures present in a test package using a pattern matching technique, wherein the test package is associated to the feature of the software, and wherein the test package consists of at least a test strategy, a test case, a test model, an automation test script, a crow dsource script and a manual test script; and
   recommending a modification to the test package based on the comparison, wherein the modification is recommended using Artificial Intelligence (AI) technique.

9. The system of claim 8, wherein the modification comprises addition, deletion, or updating an existing element of the test package.

10. The system as claimed in claim 8, wherein the keywords are extracted using at least one of a Rapid Automatic Keyword Extraction (RAKE) algorithm, a Bidirectional Encoder Representations from Transformers (BERT), a FastText, a Support Vector Machines (SVM), a Conditional Random Fields (CRF), AWS comprehend, Google Cloud Natural API, and a Term Frequency-Inverse Document Frequency (TF-IDF) algorithm.

11. The system as claimed in claim 8, wherein the keywords are extracted by removing common words present in the release note package.

12. The system as claimed in claim 8, wherein the feature is present on a User Interface (UI) or API of the software.

13. The system as claimed in claim 8, further comprises recommending modification for an E-commerce platform based on customizations covering common functionality for individual customers, wherein the modification is recommended for specific implementations of the E-commerce platform.

14. The system as claimed in claim 8, wherein the recommendation is applied to scenarios for test cases that encompass machine and software interactions, and wherein the test cases include machine only test cases and machine and software interaction test cases.

15. A non-transitory computer program product having embodied thereon a computer program for recommending a modification to a test package for a software under test, the computer program product storing instructions, the instructions comprising instructions for:

receiving a release note package associated to a feature of a software, wherein the release note package comprises at least an epic, a story board, a user story, an objective, a task, a feature name, a feature description, an attachment associated to the feature, a comment, releases notes, defect fix notes, configuration change, and code change;

during execution, analyzing the release note package in real time using machine learning based models;

extracting a keyword from the release note package using a keyword extraction technique, wherein the keyword corresponds to the feature of the software;

comparing the keyword with nomenclatures present in a test package using a pa matching technique, wherein the test package is associated to the feature of the software, and wherein the test package is associated to the feature of the software, and wherein the test package consists of at least a test strategy, a test case, a test model, an automation test script, a crowdsource script and a manual test script; and recommending a modification to the test package based on the comparison, wherein the modification is recommended using Artificial Intelligence (AI) technique.

* * * * *